May 8, 1951     C. A. DE GIERS ET AL     2,551,791
TANK CONTENTS GAUGE INDICATING WEIGHT
Filed June 23, 1948     2 Sheets-Sheet 1
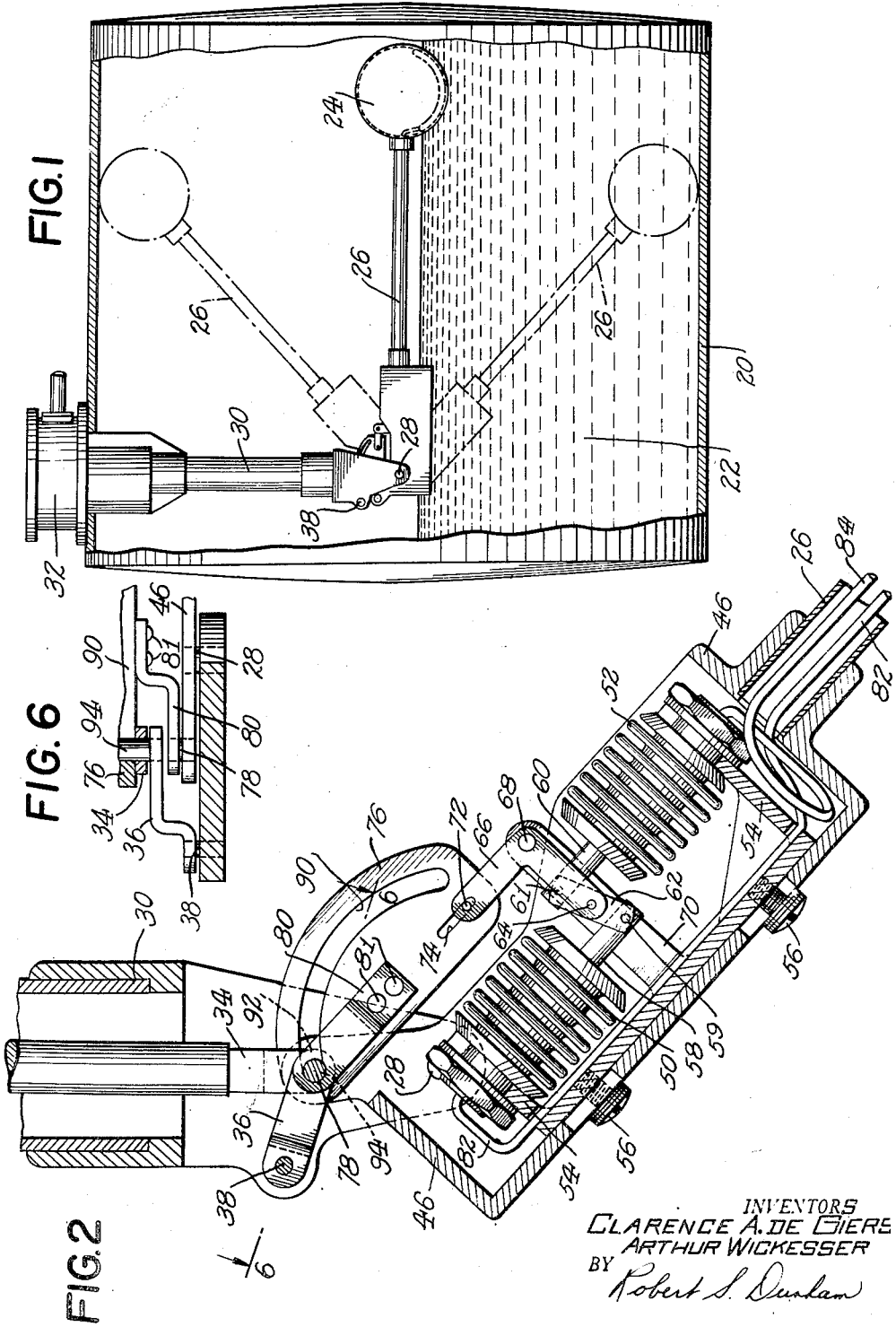
INVENTORS
CLARENCE A. DE GIERS
ARTHUR WICKESSER
BY Robert S. Dunlam
ATTORNEY

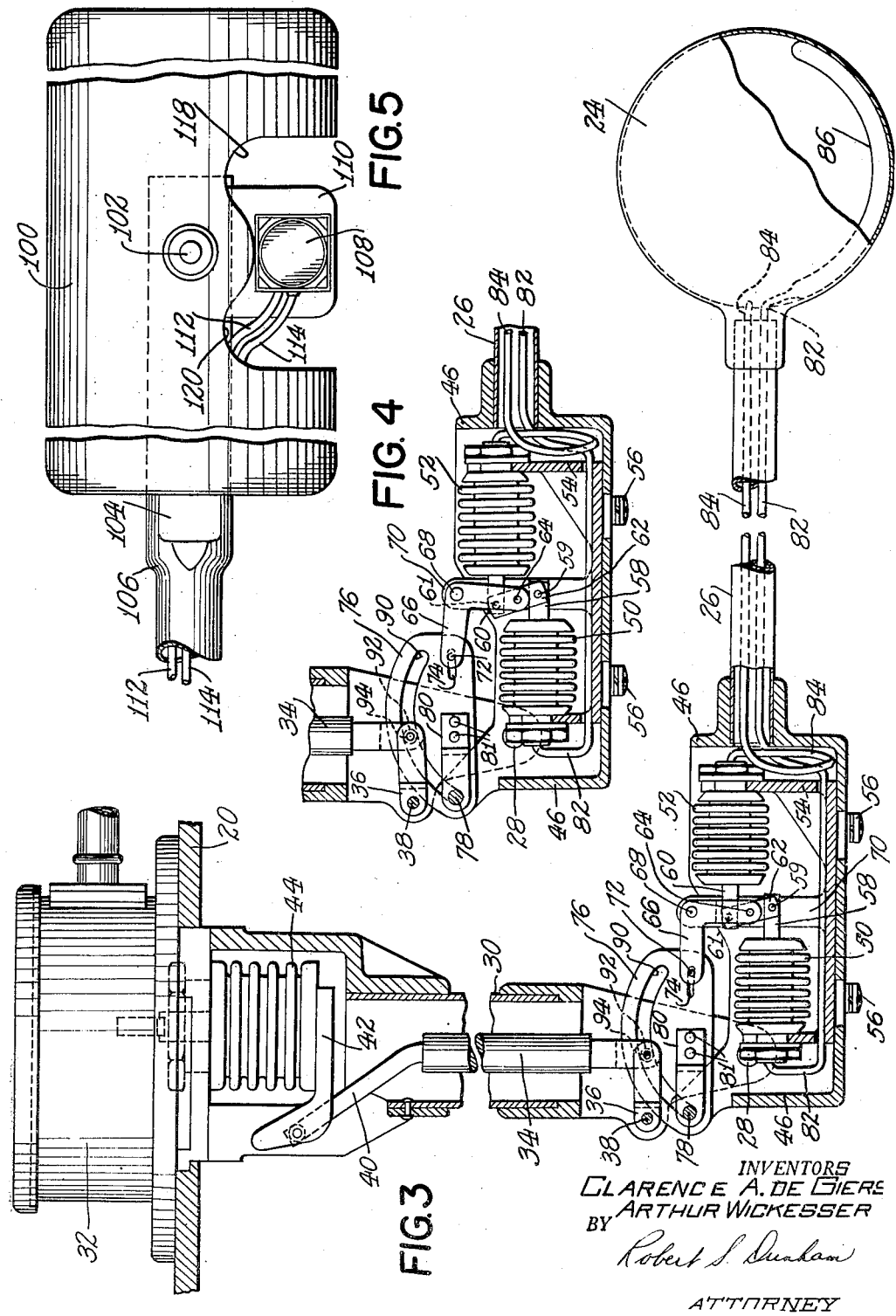

Patented May 8, 1951

2,551,791

UNITED STATES PATENT OFFICE 2,551,791

TANK CONTENTS GAUGE INDICATING WEIGHT

Clarence A. de Giers, Forest Hills, and Arthur Wickesser, St. Albans, N. Y., assignors to The Liquidometer Corporation, Long Island City, N. Y., a corporation of Delaware Application June 23, 1948, Serial No. 34,586

13 Claims. (Cl. 73—317)

This invention pertains to a gauge for indicating the liquid contents of a tank by means of a float riding on the liquid in the tank. An object of the invention is to incorporate in the instrument a thermal element which compensates for differences in temperature of the liquid in order that the gauge may be graduated in units of weight, such as pounds or grams, instead of units of volume, such as gallons or litres.

The usefulness of this invention may readily be understood by considering a gasoline tank in an airplane which is exposed to widely varying temperatures. The gasoline in the tank will expand and contract, and its density will change accordingly. The volume of the liquid might vary widely, while the total power energy of the gasoline remains unchanged. It is therefore desirable to have the tank contents gauge indicating weight instead of volume, because only weight gives a true indication of the available energy in the tank.

The invention automatically applies a temperature correction to the well known float and arm movement, so that the gauge may accurately indicate the tank contents in units of weight.

In summary, the apparatus of the present invention comprises a float adapted to be supported at the surface of a liquid in a tank, an indicator for indicating the weight of liquid in the tank, means operated by the position of the float and hence responsive to the liquid level for actuating said indicator, a temperature responsive means positioned to be controlled by the temperature of any liquid which may be in the tank, and means subject to said temperature responsive means for interposing into said indicator actuating means a temperature correction, which is progressively greater in accordance with the height of liquid in the tank, so that said indicator will be actuated in accordance with the weight of liquid in the tank and may be calibrated accordingly in units of weight. More specifically, when the indicator actuating means consists of or includes a mechanical train, the present invention interposes into this mechanical train an adjustable cam effective to interpose a zero correction onto the indicator reading for a given position of the float as when the tank is empty and to interpose a progressively greater correction incident to a relative movement between such cam and an associated cam follower, which relative movement is controlled by the temperature of the liquid, as the tank contains more and more liquid. Thus the maximum correction is interposed when the tank is full.

This application is related to copending applications of the same inventors: Ser. Nos. 41,488 and 43,828, filed on July 30, 1948, and August 12, 1948, respectively, and also is related to a sole application of De Giers, one of the present applicants, Ser. No. 41,426, filed July 30, 1948. All these applications are owned in common with the present application.

The lines of division between the present application and the other applications above identified are based on the following principles:

1. The present application is dominant over all the others and carries claims readable not only on its own disclosure, but also on the disclosures of one or more of the other applications above identified.

2. Application Ser. No. 41,426 contains only claims readable on its own particular disclosure and not readable on the disclosures of any of the other above identified applications.

3. Applications Ser. Nos. 41,488 and 43,828 are junior to the present application and as compared to one another, have priority in accordance with their respective filing dates.

Further and other objects and advantages will be apparent from the specification and claims, and from the accompanying drawings which illustrate what is now considered the preferred embodiment of the invention.

In the drawings:

Fig. 1 is a view principally in vertical section of a tank incorporating the invention, with the float at mid-position and with its full and empty positions indicated in broken lines;

Fig. 2 is an enlarged fragmentary view with some parts in vertical section of the temperature-controlled transmitter connecting the float to the indicator;

Fig. 3 is a view with some parts in vertical section of the complete instrument including indicator, transmitter, float in its horizontal position and the control bulb in the float;

Fig. 4 is a fragmentary view of a portion of the apparatus of Fig. 3 with some parts in different positions due to decreasing fuel temperature;

Fig. 5 is a fragmentary detail view principally in elevation showing a cork float in place of the hollow, metal float of Fig. 3 and a different design of control bulb on the float; and Fig. 6 is a fragmentary view taken substantially on the line 6—6 of Fig. 2, illustrating the construction of the parts in a position in which the pins 78 and 94 are in axial alignment with one another when the float is at its lowermost or "empty" position.

Fig. 1 shows a tank 20 containing liquid 22, on the surface of which rests a hollow float 24 carried on the end of an arm 26 pivoted at 28 on a stationary bracket 30 depending from the indicator 32 on the top of the tank. If desired, the indicator 32 could be the transmitter element of a telemetric indicator system in accordance with the teachings contained in the patent to De Giers, one of the present inventors, No. 2,104,898, issued January 11, 1938. This patent discloses a mechanism which may be directly substituted for the indicator 32 and certain of the operating means therefor which are hereinafter disclosed. It is further contemplated that a transmitter as disclosed in De Giers Patent No. 2,104,898 could be used in a system as disclosed in either of the patents to Lingel, Nos. 2,391,057 and 2,391,058, both issued December 18, 1945.

As the float rises and falls with the liquid in the tank the indicator is actuated by a vertical push rod 34 within bracket 30 (Fig. 3). The lower end of rod 34 is articulated to a link 36 pivoted at 38, and the upper end of the rod actuates the indicator in well known manner, through a rod extension 40, a link or crank arm 42 and a bellows 44, substantially as disclosed in De Giers Patent No. 2,104,898 aforesaid.

The mechanism above described can give correct indications of volume of liquid in the tank. The improvements which enable the device to give correct indications of weight, instead of volume, will now be described.

Float arm 26 is supported on pivot 28 through the instrumentality of a box-like frame 46 rigid with the float arm and within which is mounted a pair of similar bellows 50 and 52 interconnected by a floating link, all as shown, for instance, in De Giers Patent No. 1,943,267. The bellows are fixed at their outer ends to parallel brackets on a support 54 which is within frame 46 and attached thereto by screws 56 (Fig. 2).

The axes of the bellows are parallel but offset, their adjacent ends being provided with rigid studs 58 and 60 respectively, which are pivotally connected by pins 59 and 61 respectively to opposite ends of a floating link 62. The center of the link 62 is connected by a pivot pin 64 to the lower end of the depending arm of a bell crank 66 pivoted at 68 on the upper end of a standard 70 which is part of support 54.

The horizontal arm of bell crank 66 has secured therein a pin 72 which passes through a slot 74 in a plate cam 76 which is pivotally mounted on frame 46 by pin 78. The pin 78 is pivotally received in an offset portion of a supporting bracket 80 riveted to the cam 76 at 81.

Connected to the interior of bellows 52, at the fixed end thereof (Fig. 3), is a tube 84 extending through hollow arm 26 and terminating, with its end sealed, just within float 24.

A similar tube 82 extends from the fixed end of bellows 50 into float 24, and is extended around the lower inner surface of the float in the form of a bulb 86. The two liquid containing spaces, i. e. bellows 52 with its tube 84 on the one hand and bellows 50, tube 82 and bulb 86 on the other are respectively hermetically sealed after being filled with a liquid able to withstand all temperatures encountered by aircraft.

Tubes 82 and 84 being similar as to diameter and length outside of bulb 86, and bellows 50 and 52 being similar, any change of atmospheric temperature above the liquid in the tank will affect tube 82 and its bellows 50 exactly as tube 84 and its bellows 52 are affected; consequently both bellows, under such conditions, will expand or contract similar amounts axially, thus swinging link 62 idly about its pivot 64 without moving bell crank 66 or cam 76. However, any change of temperature of liquid 22, on which float 24 is resting, will change the temperature of bulb 86 and, as a consequence, fluid will be forced into or out of bellows 50, link 62 will swing on pin 59 or 61 causing pivot pin 64 to rotate bell crank 66 about its pivot 68, and, acting through pin 72 in slot 74, will rotate cam 76 about its point of support, i. e. the axis of pin 78.

Cam 76 is provided with a curved slot 90 in which is loosely received a roller 92 on the pin 94 which connects rod 34 and its guiding link 36. The indicator 32 is operated by cam 76 through roller 92 and cam slot 90, which is shaped to raise or lower push-rod 34 under control of bell crank 66.

The operation of this gauge will now be described in detail. Consider first the condition when the tank is empty as represented in Fig. 1 by the float 24 at the bottom of tank 20. It will be realized that for this particular position, when there is no liquid in the tank, there can be no error due to liquid expansion, and hence the compensation must also be neutralized. When the tank is empty, pivot pin 78 and pin 94 are arranged to be in coaxial positions, this being permitted by the arrangement above described in which pin 78 is pivoted in the offset portion of bracket 80, while pin 94 and its roller 92 are arranged substantially in the plane of cam 76. Assuming normal temperature, the compensating elements will appear as indicated in greater detail in Fig. 2 with the upper arm of bell crank 66 substantially parallel with float arm 26. If the temperature now decreases, the float will remain at its bottom position since it is not buoyant. In the compensating element the decreased temperature will contract the fluid in bulb 86 causing bellows 50 to contract lengthwise, rocking cam 76 upwardly about its pivot 78. However, since pivot 78 is now coaxial with pivot 94, as previously explained, this will not result in any vertical displacement of push rod 34, and the zero reading will remain unaffected. It will now become apparent that for the empty position, and only this position, either an increase or a decrease of temperature will cause the cam element 76 to turn about an axis common to the pins 78 and 94 and hence produce no linear movement of the push rod or the indicator actuated therethrough.

Consider now a second position such as when float 24 is at the center of tank 20 as shown in full lines in Fig. 1. The action of the compensating elements will now become more apparent from the disclosures of Figs. 3 and 4 which correspond to the center position of Fig. 1. Under normal conditions of temperature the linkage system will appear substantially as indicated by Fig. 3, with the upper arm of bell crank 66 again substantially parallel with float arm 26. If the temperature now decreases, the liquid in tank 20 will contract, reducing its level, and hence cause the float position to be correspondingly lowered. It follows that if no compensation were used, the indicator reading would decrease giving an erroneous indication in terms of weight. However, the decrease in temperature will also cause the fluid in bulb 86 to contract. Bellows 50 will similarly contract lengthwise, drawing pivot point 64 to the left, and rotating bell crank 66 clockwise as seen from Fig. 4. In turn, cam element 76 will be moved counterclockwise about the axis of pin 78, resulting in a corresponding upward movement of push rod 34. Therefore, it will now become apparent that a lowering of the push rod 34 due to the drop in float (resulting from contraction of fuel volume from temperature effects) will be neutralized by a corresponding lift of the push rod due to movement of cam 76 (resulting from temperature response of the bellows). Therefore, there will result no difference in reading at the indicator. By way of comparison with the first case (when the float was at the bottom position), it will be noticed that in the second case, the pivot points corresponding to the axes of pins 78 and 94 are no longer coaxial, but are separated by a section of arc in the cam. Any rotation of cam element 76 about the axis of pin 78 will now bring about a vertical displacement of the axis of pin 94 and hence of push rod 34. It follows that this corresponding action will be zero for an empty tank, and will gradually increase to a maximum for a full tank.

It will also be apparent that the shape of cam 90 can be designed to compensate for irregularly shaped tanks.

Under certain conditions it may be advisable to use a cork float as in Fig. 5 instead of the hollow metallic type (float 24) described above. The cork float is shown in substantially the form of a horizontal cylinder 100 free to rotate on a horizontal pin 102 fixed in a flattened end portion 104 of the tubular float arm 106. The thermometer bulb is a horizontal submerged tube 108 supported by a vertical plate 110 attached to flattened arm 104. The two capillary tubes 112, 114 corresponding respectively to the tubes 84 and 82 extend through tubular arm 106 to the bellows.

Float 100 remains horizontal while arm 106 moves through its angular positions between top and bottom of the tank; therefore the float is cut away as indicated at 118, 120 to avoid contact with bulb 108.

It is to be understood that the invention is not limited to the specific embodiment herein illustrated and described but may be used in other ways without departure from its spirit as defined by the following claims.

We claim:

1. Apparatus for indicating the liquid contents of a container in units of weight, comprising a float arranged to float on the liquid in the container, an indicator, means including a mechanical train for operating said indicator by said float, means for containing a thermally expansible fluid including a chamber-forming portion arranged to be subjected externally to the liquid in said container, so that the fluid in said chamber-forming portion will expand and contract in accordance with the temperature of the liquid in the container, means mechanically movable by and in accordance with the expansion and contraction of the thermally expansible fluid in said chamber-forming portion, and means connecting said mechanically movable means to said mechanical train to interpose a temperature correction into the indication of said indicator for any position of said float, so that said indicator may be calibrated in units of weight and give accurate indications thereof independently of variations in the volume of said liquid resulting from changes in its temperature.

2. Apparatus for indicating the liquid contents of a container in units of weight, comprising a float arranged to float on the liquid in the container, an indicator, means including a mechanical train for operating said indicator by said float, said mechanical train including a movable element having a sector-shaped actuating portion and means for engaging said sector-shaped actuating portion for actuating said indicator, means also included in said mechanical train for moving said movable element about one center eccentric of said sector-shaped actuating portion and in response to the level of liquid in said container, and means responsive to the temperature of said liquid for moving said movable element about a second center also eccentric of said sector-shaped actuating portion for interposing a temperature correction into said mechanical train, so that said indicator may be calibrated in units of weight and give accurate indications thereof independently of variations in the volume of said liquid resulting from changes in its temperature.

3. Apparatus in accordance with claim 2, wherein said second center is concentric with the position of said engaging means at the zero position of said indicator, whereby no temperature correction is interposed into the reading of said indicator at the zero position thereof.

4. Apparatus in accordance with claim 2, wherein said means responsive to the temperature of said liquid comprises means for containing a thermally expansible fluid including a chamber-forming portion arranged to be subjected externally to the liquid in said container, so that the fluid in said chamber-forming portion will expand and contract in accordance with the temperature of the liquid in the container, means mechanically movable by and in accordance with the expansion and contraction of the thermally expansible fluid, and means connected to said mechanically movable means for moving said movable element about said second center.

5. Apparatus for indicating the liquid contents of a container in units of weight, comprising a float arranged to float on the liquid in the container, an indicator, means including a mechanical train for operating said indicator by said float, said mechanical train including a movable element having a sector-shaped actuating portion and means for engaging said sector-shaped actuating portion for actuating said indicator, means also included in said mechanical train for moving said movable element about one center eccentric of said sector-shaped actuating portion and in response to movements of said float; means responsive to the temperature of said liquid for moving said movable element including means providing a chamber for a thermally expansible fluid which chamber is in contact externally with the liquid in said container and is movable with said float, and mechanical means actuated by expansion and contraction of said fluid for moving said movable element about a second center also eccentric of said sector-shaped actuating portion for interposing a temperature correction into said mechanical train; so that said indicator may be calibrated in units of weight and give accurate indications thereof independently of variations in the volume of said liquid resulting from changes in its temperature.

6. Apparatus for indicating the liquid contents of a container in units of weight, comprising a float arranged to float on the liquid in the container, an indicator, means including a mechanical train for operating said indicator by said float, said mechanical train including a cam element having a sector-shaped cam surface portion and a cam follower for engaging said cam surface portion and for actuating said indicator, means also included in said mechanical train for moving said cam element about one center eccentric of said cam surface portion and in response to movements of said float; means responsive to the temperature of said liquid for moving said cam element including means providing a chamber for a thermally expansible fluid which chamber is in contact externally with the liquid in said container and is movable with said float, and mechanical means actuated by expansion and contraction of said fluid for moving said cam element about a second center also eccentric of said sector-shaped cam portion for interposing a temperature correction into said mechanical train; so that said indicator may be calibrated in units of weight and give accurate indications thereof independently of variations in the volume of said liquid resulting from changes in its temperature.

7. Apparatus for indicating the liquid contents of a container in units of weight, comprising a float arranged to float on the liquid in the container, an arm carrying said float adjacent to its outer end, means pivotally supporting an inner end portion of said arm for movement about a predetermined, substantially horizontal axis fixed with respect to said container, an indicator, means including a mechanical train actuated by the position of said arm for operating said indicator, said mechanical train including a cam element pivoted to a point on said arm eccentric of said axis, said cam element having an actuating cam surface formed thereon, a cam follower engaging said cam surface and forming a part of said mechanical train for actuating said indicator, the parts aforesaid being constructed and arranged so that movement of said arm in response to a change in the level of the liquid in said container tends to control the indication given by said indicator, and means carried by said arm and responsive to the temperature of the liquid in said container for moving said cam element in respect to said arm to interpose a temperature correction into said mechanical train, so that said indicator may be calibrated in units of weight and give accurate indications thereof independently of variations in the volume of said liquid resulting from changes in its temperature.

8. Apparatus in accordance with claim 7, wherein said temperature responsive means comprises a bellows fixed at one end and free to move at the other, a thermally expansible fluid in said bellows and arranged to be exposed to the temperature of the liquid in said container, so that the expansion and contraction of said expansible fluid will be in accordance with the temperature of said liquid and will serve to expand and contract said bellows accordingly, and means mechanically connecting the free end of said bellows to said cam element for moving it in accordance with the temperature of said liquid to interpose a temperature correction into said mechanical train.

9. Apparatus in accordance with claim 7, wherein said float is mounted for pivotal movement on the outer end portion of said arm, wherein said temperature responsive means includes means forming a closed fluid-containing system having a thermally expansible fluid therein, said system including a bulb carried by the outer end of said arm and arranged to be immersed in the liquid in said container when said float is floating on the surface of such liquid, said system further including a duct communicating with said bulb and with an expansible bellows for actuating said cam element in accordance with the temperature of the liquid.

10. Apparatus in accordance with claim 7, wherein said float is formed as a hollow substantially spherical element carried by the outer end of said arm, and wherein said temperature responsive means comprises means forming a closed fluid-containing system including a bulb within and located in the lower portion of said float, so that thermally expansible fluid in said bulb will be exposed to and will expand and contract in accordance with the temperature of the liquid in which said float is floating, said system further including a duct from said bulb, and a bellows communicating with said bulb through said duct, and means mechanically responsive to the expansion and contraction of said bellows, in accordance with the temperature of said liquid, for moving said cam element in respect to said arm to interpose a temperature correction into said mechanical train.

11. Apparatus in accordance with claim 7, wherein said temperature responsive means comprises means forming a closed fluid-containing system, a thermally expansible fluid in said system, means forming a part of said system providing a chamber for some of said fluid, which chamber is externally exposed to the liquid in said container, so that the expansion and contraction of said fluid will be proportional to the temperature of said liquid, an expansible bellows connected to said chamber by a duct and included in said system, means mechanically responsive to the expansion and contraction of said bellows for moving said cam element in respect to said arm to interpose a temperature correction into said mechanical train; and comprising in addition, means for compensating for temperature changes affecting said expansible fluid in said duct and in said bellows and comprising a second bellows and a duct extending therefrom to a point adjacent to said chamber, but sealed at such point, and containing a similar expansible fluid, and means mechanically interconnecting said bellows so that temperature changes other than those affecting the temperature of said liquid and serving only to affect the temperature in said ducts and in both said bellows will be balanced out and will not affect the position of said cam element as determined solely by the temperature of said liquid.

12. Apparatus for indicating the liquid contents of a container in units of weight, comprising a float arranged to float on the liquid in the container, an indicator, means including a mechanical train for operating said indicator by said float, said mechanical train including a cam capable of and positioned by two independent movements, means mechanically responsive to movement of said float in response to changes in the liquid level in said container for moving said cam in one of its said two movements, means movable with said float and subject to the temperature of the liquid in said container for mechanically moving said cam in the other of its said two movements, so as to position said cam in accordance with the liquid level and also as a function of the temperature of the liquid in the container, and a cam follower engaging said cam and forming a further part of said mechanical train for operating said indicator in accordance with the resultant positioning of said cam, so that said indicator may be calibrated in units of weight and give accurate indications thereof independently of variations in the volume of said liquid resulting from changes in its temperature.

13. Apparatus in accordance with claim 12, wherein said means subject to the temperature of the liquid in said container comprises a bellows containiing a thermally expansible fluid, which bellows is caused to expand and contract subject to the temperature of the liquid in said container, and means including a bell crank lever mechanically connecting said bellows with said cam for moving said cam in the other of its said two movements.

CLARENCE A. DE GIERS.
ARTHUR WICKESSER.

REFERENCES CITED

The following references are of record in the file of this patent:

UNITED STATES PATENTS

| Number | Name | Date |
| --- | --- | --- |
| Re. 18,514 | Reeves | July 5, 1932 |
| 1,772,929 | De Giers | Aug. 12, 1930 |
| 1,791,489 | De Giers | Feb. 10, 1931 |
| 2,369,027 | De Giers | Feb. 6, 1945 |